United States Patent [19]

Nagamatsu

[11] Patent Number: 5,621,910
[45] Date of Patent: Apr. 15, 1997

[54] SYSTEM FOR CONTROLLING INSTRUCTION DISTRIBUTION FOR USE IN SUPERSCALAR PARALLEL PROCESSOR

[75] Inventor: Masato Nagamatsu, Ooita, Japan

[73] Assignee: Kabushiki Kaisha Toshiba, Kawasaki, Japan

[21] Appl. No.: 376,645

[22] Filed: Jan. 20, 1995

Related U.S. Application Data

[63] Continuation of Ser. No. 876,077, Apr. 28, 1992, abandoned.

[30] Foreign Application Priority Data

Apr. 30, 1991 [JP] Japan .................................. 3-099131

[51] Int. Cl.$^6$ ............................... G06F 9/38; G06F 9/46
[52] U.S. Cl. ........................... 395/379; 395/382; 395/392
[58] Field of Search ................................... 395/379, 392, 395/395, 382, 376

[56] References Cited

U.S. PATENT DOCUMENTS

| | | | |
|---|---|---|---|
| 4,532,589 | 7/1985 | Shintani et al. | 395/375 |
| 4,916,652 | 4/1990 | Schwarz et al. | 364/748 |
| 4,928,226 | 5/1990 | Kamada et al. | 395/375 |
| 4,935,849 | 6/1990 | Miranker | 364/730 |
| 4,954,945 | 9/1990 | Inoue | 395/650 |
| 5,073,855 | 12/1991 | Staplin et al. | 395/375 |
| 5,127,093 | 6/1992 | Moore, Jr. | 395/375 |
| 5,241,644 | 8/1993 | Nomura et al. | 395/425 |
| 5,295,249 | 3/1994 | Blaner et al. | 395/375 |
| 5,459,844 | 10/1995 | Eickemeyer et al. | 395/375 |

FOREIGN PATENT DOCUMENTS 3-35322  2/1991  Japan .

OTHER PUBLICATIONS

Talmudi, R. et al., "A 100MIPs, 64b Superscalar Microprocessor with DSP Enhancements," 1991 IEEE International Solid–State Circuits Conference Digest of Technical Papers, pp. 100–101 (Feb. 1991).

Superscalar Microprocessor Design by Mike Johnson, 1991 (pp. 9–17), Prentice-Hall, New Jersey 07626.

Benua, D. R., McAlpine, G., "Retarget Vector Processor Software." Electronic Design, vol. 37, No. 10, pp. 93 (4). May 1989.

*Primary Examiner*—Thomas G. Black
*Assistant Examiner*—Jack M. Choules
*Attorney, Agent, or Firm*—Finnegan, Henderson, Farabow, Garrett & Dunner, L.L.P.

[57] ABSTRACT

In an instruction distribution control device for parallel execution of instructions for use in a superscalar parallel processor, the control device comprises an instruction distribution starting position pointer register, an instruction distribution enable/disable signal generating circuit, and an updating circuit. The distribution starting position pointer register indicates from which instruction of N (>1) instructions the distribution is to be started. The instruction distribution enable/disable signal generating circuit generates signals for determining whether the instructions may or may not be distributed to instruction executing arithmetic units on the basis of the contents of the instruction distribution starting position pointer register and signals indicating the results of dependence analysis for examining resource conflict. The updating circuit generates information indicating to which instruction of the N instructions the execution has advanced on the basis of the instruction distribution enable/disable signals and signals indicating the results of dependence analysis for examining data conflict and updates the instruction distribution starting position indicated by the instruction distribution starting position pointer register.

5 Claims, 3 Drawing Sheets

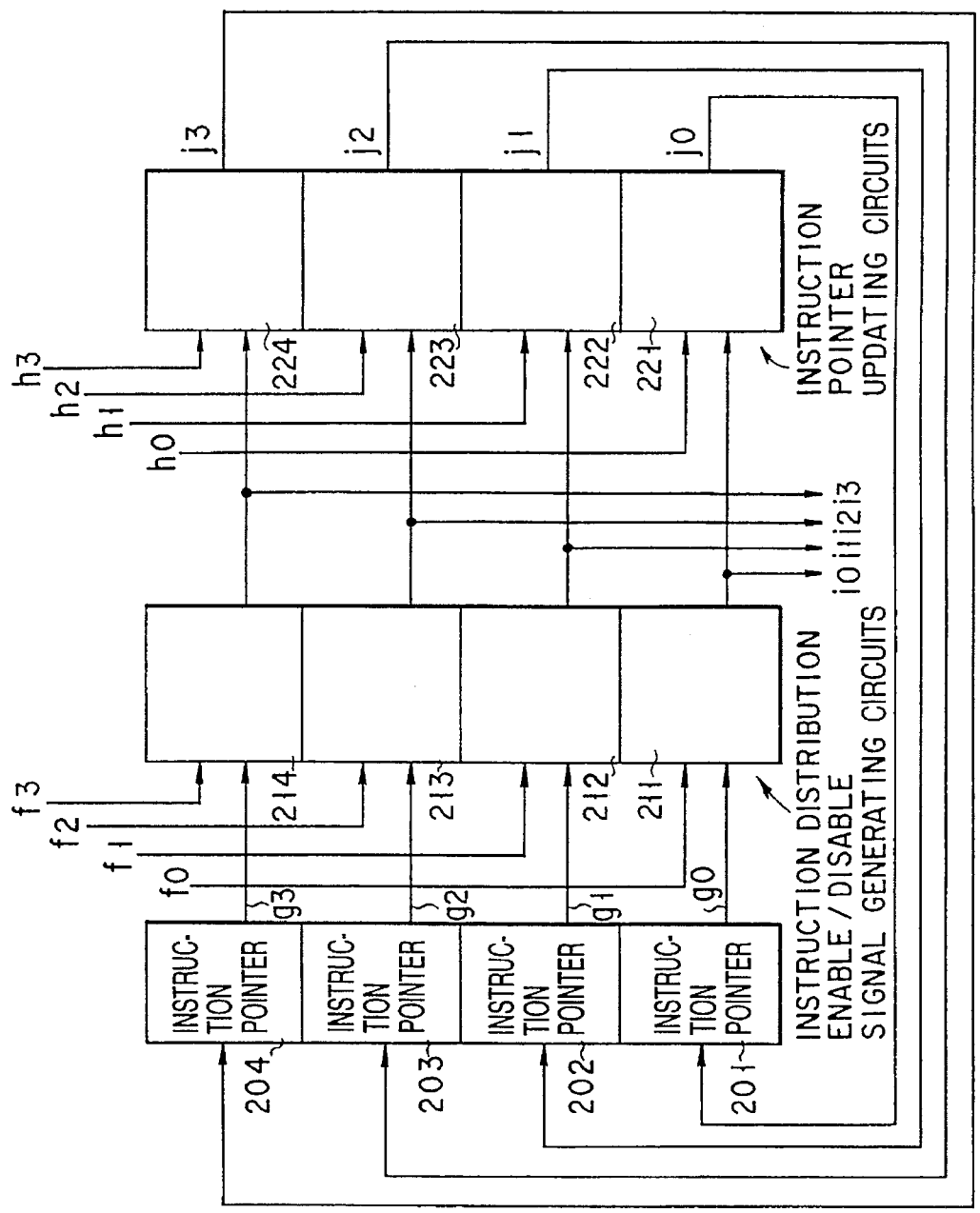
F I G. 2

2

SYSTEM FOR CONTROLLING INSTRUCTION DISTRIBUTION FOR USE IN SUPERSCALAR PARALLEL PROCESSOR

This application is a continuation of application Ser. No. 07/876,077 filed Apr. 28, 1992, now abandoned.

BACKGROUND OF THE INVENTION

1. Field of the Invention

The present invention relates to an RISC (reduced instruction set computer) type of microcomputer, and more particularly to an instruction distribution control device for controlling the distribution of instructions for parallel execution for use in a superscalar type of parallel processor which executes two or more instructions simultaneously.

2. Description of the Related Art

The mainstream method for data processing used in conventional data processors is the SISD (single instruction stream single data stream) in which instructions are processed in sequence one at a time. The requirements for increased efficiency in data processing has been met by increasing the width of data to be handled or the operating frequency. The requirements for further increased processing efficiency has been met by the use of a pipelining system which divides one process into several sections and processes two or more items of data simultaneously or by the addition of special-purpose hardware such as a floating-point arithmetic unit.

The MIMD (Multiple Instruction stream Multiple Data stream) system that executes two or more instructions simultaneously is effective in still further increasing the processing efficiency of a processor. This system uses two or more instruction executing arithmetic units and operates them at the same time. MIMD processors include array processors having an array of arithmetic units of the same arithmetic mode, superscalar types of parallel processor having two or more arithmetic units of different arithmetic modes and two or more pipelines.

The array processor is difficult to be applied to general data processing and thus suffers restriction on its applications. In contrast, the superscalar parallel processors are relatively easy to be applied to general data processing because their control system can be considered to be an expansion of the control system of conventional processors.

The superscalar parallel processor operates two or more instruction executing arithmetic units at the same time to execute two or more instructions in parallel during one clock cycle. In this case, the parallel processor shows instruction processing capabilities greater than those in conventional processors because two or more instructions are fetched, decoded, and then executed by the arithmetic units at the same time.

As a specific example of the superscalar parallel processor, there is a processor in which one floating-point arithmetic unit is added to two integer arithmetic units, and a total of two instructions, i.e., two integer arithmetic instructions (usual instructions in processors) or one integer arithmetic instruction and one floating-point arithmetic instruction, are executed in parallel (1991 IEEE ISSCC Digest of TECHNICAL Paper pp. 100–101, "A 100 MIPS, 64b Superscalar Microprocessor with DSP Enhancement" by Ran Talmudi, et al).

In the superscalar parallel processor, the number of instructions that can be executed at the same time is limited by the number of instruction executing arithmetic units that can be driven at the same time. The conventional processors process a set of instructions one by one, while, the superscalar processor processes a set of instructions N by N. The control system of the superscalar processor corresponds to an expansion of the control system of the conventional processors, and thus conventional processor programs can be used as they are without need of rewriting.

In other words, the superscalar processor could be realized by preparing an instruction decoder, which may be a conventional one, for each of arithmetic units, and adding a control function for parallel processing (an instruction distribution control function, in particular). The control function includes examination of whether or not parallel processing of instructions is possible (hereinafter referred to as dependence analysis), and allocation of instructions that can be executed in parallel to instruction executing arithmetic units. The instruction allocation control function is particularly important, which allocates instructions to appropriate instruction executing arithmetic units on the basis of the results of the dependence analysis.

Here, the necessity of the instruction allocation control function will be described. Even if a superscalar parallel processor system is configured such that as many as N (N>1) instructions can be executed in parallel, N instructions cannot always be executed in parallel. That is, arithmetic units that have been prepared are not necessarily adapted for processing all of input instructions, and thus, when the number of arithmetic units adapted for processing some of input instructions is insufficient, they cannot be executed simultaneously with the other input instructions (this is called resource conflict). Thus it will be appreciated that as many as N instructions cannot always be executed in parallel. Further, even if the number of arithmetic units adapted for processing instructions is sufficient, and if data used for executing some instruction is prepared by execution of another instruction to be executed later, the instruction will not be executed until the data is prepared (this is called data conflict). The data conflict, unlike the resource conflict, is difficult to examine prior to execution of each instruction. Therefore, when the data conflict is found after instructions have been allocated, the execution of instructions is stopped.

When an instruction cannot be executed by reason of the resource conflict or the data conflict, an instruction which, of simultaneously distributed instructions, is behind the former in order cannot also be executed simultaneously.

Thus, when N instructions include some instructions that cannot be executed simultaneously, control is performed in a such a way as to execute all the instructions that can be executed first and then execute the remaining instructions. That is, the dependence analysis is made of each of N instructions. As a result of this, suppose that the i-th (i≦N) instruction cannot be executed simultaneously with other instructions. First, the first to (i−1)st instructions are executed, and then the dependence analysis is again made of the (N−i+1) remaining instructions to execute the remaining instructions, including the instruction that could not be executed. After the termination of execution of N instructions, N succeeding instructions are executed.

However, conventional devices are relatively complicated in structure and relatively low in efficiency of the instruction distribution.

Further, conventional devices are relatively low in speed of operation for storing an instruction distribution starting position.

Moreover, conventional devices are relatively low in speed of operation for generating instruction distribution enable/disable signals from the results of resource conflict examinations.

SUMMARY OF THE INVENTION

It is an object of the present invention to provide an instruction distribution control device for use in a parallel processor which permits efficient instruction distribution for parallel execution of instructions with a simple configuration.

It is another object of the present invention to provide an instruction distribution control device for use in a parallel processor which permits speeding up of an operation for storing an instruction distribution starting position.

It is a further object of the present invention to provide an instruction distribution control device for use in a parallel processor which permits speeding up of an operation for generating instruction distribution enable/disable signals from the results of resource conflict examination.

According to the present invention, an instruction distribution control device for parallel execution of instructions for use in a superscalar parallel processor configured to execute as many as N (>1) instructions in parallel and having two or more pipelines comprises:

an instruction distribution starting position pointer indicating from which instruction of the N instructions the distribution is to be started;

an instruction distribution enable/disable signal generating circuit for generating signals for determining whether the instructions may or may not be distributed to instruction executing arithmetic units on the basis of the contents of said instruction distribution starting position pointer and signals indicating the results of dependence analysis for examining resource conflict; and an updating circuit for generating a flag indicating to which instruction of the N instructions the execution has advanced on the basis of the instruction distribution enable/disable signals and signals indicating the results of dependence analysis for examining data conflict, and updating the instruction starting position indicated by said instruction distribution starting position pointer in accordance with the contents of the flag.

In spite of having a simple configuration comprised of the instruction distribution starting position pointer, the instruction distribution enable/disable signal generating circuit, and the updating circuit, the instruction distribution control device permits efficient instruction distribution for parallel execution control.

When as many instruction distribution starting position pointers as there are instructions that can be processed in parallel are provided in order to save decode time, the instruction distribution starting position storing operation can be speeded up. In addition, when a carry look ahead circuit is used as the circuit for generating instruction distribution enable/disable signals from the results of resource conflict examination, the signal generating operation can be speeded up.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 shows a specific arrangement of the instruction distribution control device of FIG. 1.

DETAILED DESCRIPTION OF THE PREFERRED EMBODIMENTS

Figure 1:
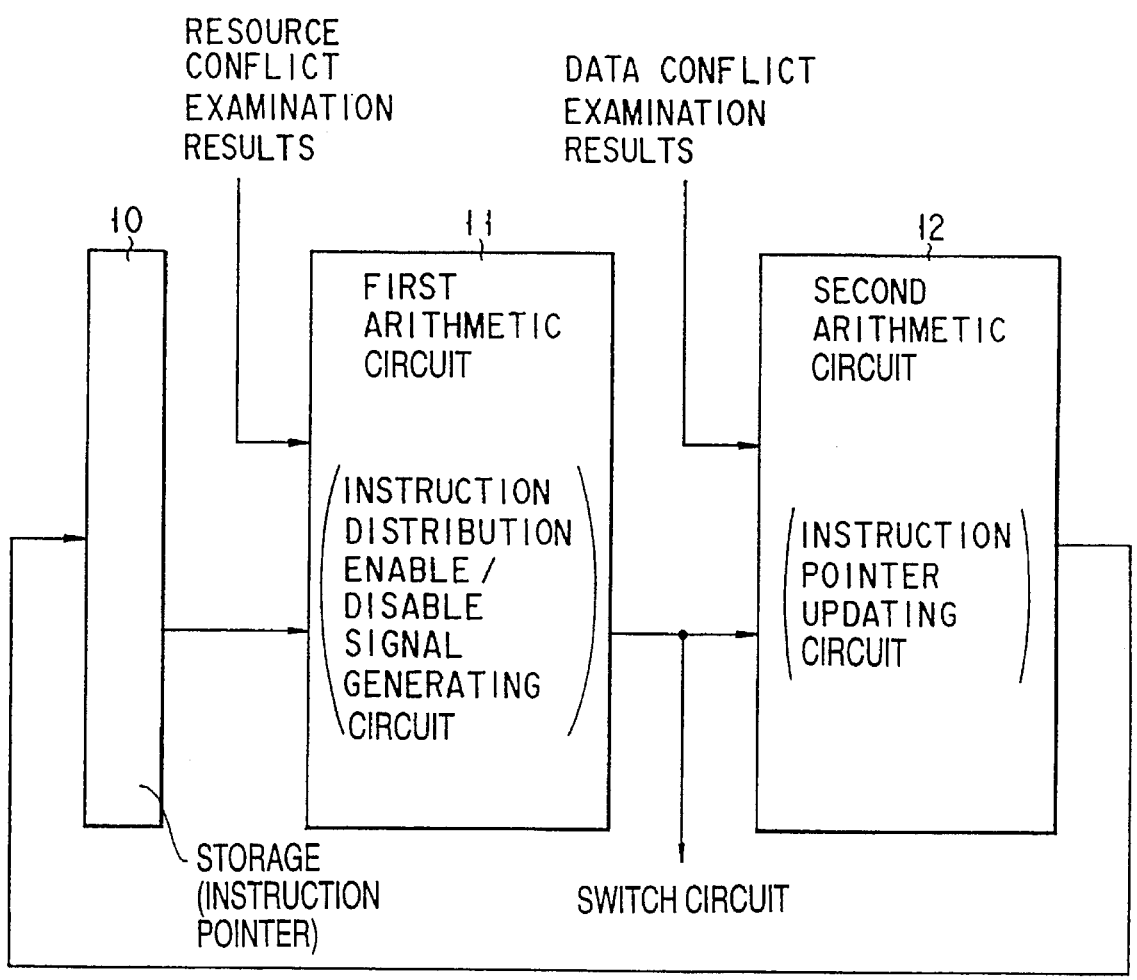
FIG. 1 shows a configuration of an instruction distribution control device for use in a parallel processor according to the present invention.

Referring now to FIG. 1, there is shown a configuration of an instruction distribution control device for performing instruction distribution control for parallel execution of instructions in a superscalar parallel processor (not shown) having two or more pipelines. The superscalar parallel processor having two or more pipelines includes different types of instruction executing arithmetic units (adders, subtracters, etc.). The parallel processor makes examination of whether or not instructions can be executed in parallel (dependence analysis), and performs allocation of instructions that can be executed in parallel to appropriate arithmetic units. The parallel processor is configured to operate the arithmetic units simultaneously, thereby executing as many as N (N>1) instructions in parallel during one clock cycle.

Reference numeral 10 denotes an instruction distribution starting position pointer register (hereinafter referred to as an instruction pointer) which has a bit length corresponding to the number N of instructions that are executed in parallel and indicates which of the N instructions the distribution begins with. The register 10 consists of a storage device. Reference numeral 11 denotes a first arithmetic circuit which is responsive to the contents of the instruction pointer 10 and first input signals (signals indicating the results of the dependence analysis for examining the resource conflict) corresponding in number to the instructions to generate as many output signals as there are instructions. The output signals of the first arithmetic circuit 11 indicate determination of whether distribution of the instructions to instruction executing arithmetic units is enabled or disabled. Hereinafter, the first arithmetic circuit is referred to as the instruction distribution enable/disable signal generating circuit. The instruction distribution enable/disable signals are applied to an instruction distribution switching circuit (not shown).

Reference numeral 12 denotes a second arithmetic circuit which generates information (flag) indicating how far instruction execution has terminated in the N instructions on the basis of the instruction distribution enable/disable signals and two or more second input signals (indicating the results of the dependence analysis for examining data conflict), and updates the contents of the pointer register 10 to indicate an instruction distribution starting position for a next execution of instruction in accordance with the contents of the flag. The second arithmetic circuit is hereinafter referred to as the instruction pointer updating circuit.

FIG. 2 illustrates a specific arrangement of the instruction distribution control device of FIG. 1 in the case of N=4. Four instruction pointers 201 to 204 of one bit each correspond to four instructions. A bit corresponding to the starting instruction is set to one, and the other bits are set to zeros. Thus, the contents of the instruction pointers 201 to 204 assume (1, 0, 0, 0), (0, 1, 0, 0), (0, 0, 1, 0) or (0, 0, 0, 1). The instruction distribution enable/disable signal generating circuit 211 to 214 are responsive to the contents (output signals g0 to g3) of the instruction pointers 201 to 204 and the resource conflict examination (dependence analysis) signals (f0 to f3) to determine that, of the four instructions, which instructions may be distributed, and generate instruction distribution enable/disable signals i0 to i3 for the four instructions.

The instruction pointer updating circuits 221 to 224 are responsive to the instruction distribution enable/disable signals (i0 to i3) and the data conflict examination (dependence analysis) signals (h0 to h3) to understand the instruction execution situation (to which instruction of the N instructions the execution has advanced) and generate instruction execution termination flag signals (j0 to j3) indicating the instruction execution situation, which are output to the instruction pointers 201 to 204.

In spite of having a relatively simple configuration comprised of the instruction pointers 201 to 204, the instruction distribution enable/disable signal generating circuits 211 to 214, and the instruction pointer updating circuits 221 to 224, the instruction distribution control device described above permits effective instruction distribution control for parallel execution of instructions. That is, in the case where the i-th (i≦N) instruction cannot be executed because of resource conflict or data conflict, it becomes possible to control in such a way as to execute the first to (i−1)st instructions first and then make dependence analysis of the (N−i+1) remaining instructions again for execution of the remaining instructions.

In the case of the data conflict, it becomes possible to perform control in such a way as to stop the execution of instructions after they have been distributed. In addition, after all the N instructions have been executed, it becomes possible to perform control in such a way as to execute a number N of new, succeeding instructions.

Suppose now that four input instructions in a clock cycle are as follows:

Add r1+r2→r3

Sub r3−r4→r5

Load Memory→r6

Store r5→Memory

In addition, suppose that an adder and a subtracter are provided as instruction executing arithmetic units.

In this case, since the adder can be used for the Add instruction and the subtracter can be used for the Sub instruction, no resource conflict takes place between the Add instruction and the Sub instruction. Further, no resource conflict does not take place between the Sub instruction and the Load instruction. However, a resource conflict occurs between the Load instruction and the Store instruction because these instructions use data bus at one time for execution of both of these instructions. Thus, the resource conflict examination signals (f0, f1, f2, f3) are (1, 1, 1, 0). At this point, the contents (g0, g1, g2, g3) of the instruction pointers 201 to 204 are (1, 0, 0, 0). Thus, the output signals (i0, i1, i2, i3) of the instruction distribution enable/disable signals become (1, 1, 1, 0), and three of the instructions which correspond to the flags i0, i1 and i2 are distributed by an instruction distribution circuit (not shown) to a respective one of items (the adder, subtracter, memory).

The signals (i0, i1, i2, i3) are also input to the instruction pointer updating circuits 221 to 224 which receive the data conflict examination signals h0 to h3, respectively.

Next, the dependence analysis is made of the Add instruction and the Sub instruction. Since the Add instruction is r1+r2→r3 and the Sub instruction is r3−r4→r5, it will be appreciated that the execution of the Sub instruction must be deferred until the Add instruction has been terminated. That is, a data conflict exists between the Add instruction and the Sub instruction. However, no data conflict occurs between the Sub instruction and the Load instruction, and between the Load instruction and the Store instruction. Thus, the data conflict examination signals (h0, h1, h2, h3) become (1, 0, 1, 1). Since there exists the data conflict between the Add instruction and the Sub instruction the execution of the Sub instruction is stopped, and the execution of the Load instruction behind the Sub instruction is also stopped. The output signals (j0, j1, j2, j3) of the instruction pointer updating circuits 221 to 224 are thus (0, 1, 0, 0). Thus, in the clock cycle, only the Add instruction is executed, and the arithmetic result there of is stored in a predetermined register r3.

In the next clock cycle, the resource conflict analysis or the data conflict analysis are made again. At this point, since the execution of the Add instruction has been terminated, and its result has been stored in the register r3, the Sub instruction is executable, and the contents of the data conflict examination signals change. Thus, the contents of the instruction pointers become (0, 1, 0, 0), so that the Sub instruction is executed. The Load instruction behind the Sub instruction in order is simultaneously executed. The arithmetic result of the Sub instruction is stored in a register r5, and the contents of the memory is loaded into a register 6. The Store instruction is executed in the succeeding clock cycle after the Load instruction has been executed. In this way, the four instructions are executed.

Figure 3:
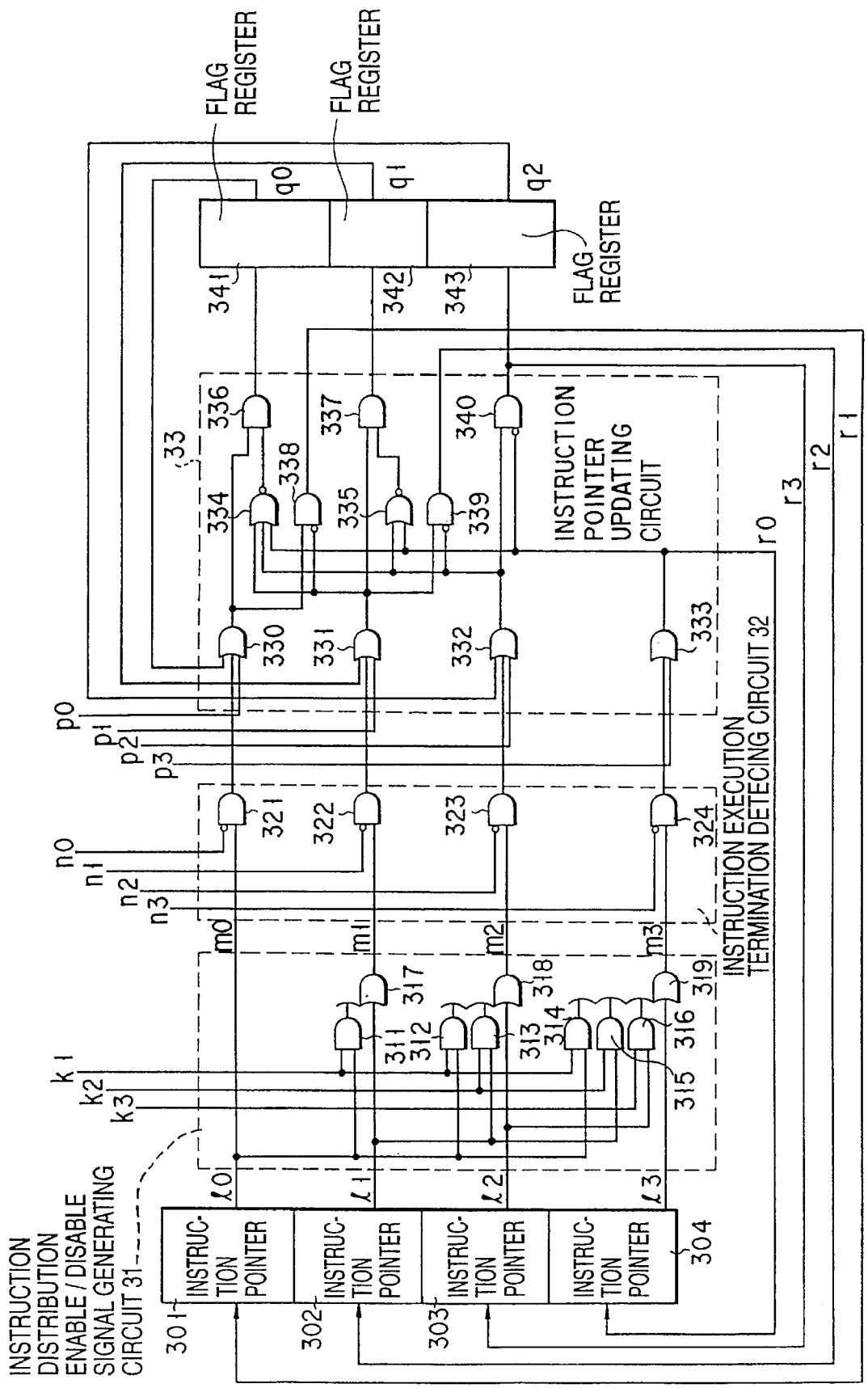
FIG. 3 shows still another specific arrangement of the instruction distribution control device of FIG. 1.

FIG. 3 illustrates the other embodiment (N=4) of the instruction distribution processing device of FIG. 1. Reference characters 301 to 304 denote instruction pointers, l0 to l3 denote pointer outputs, k1 to k3 denote resource conflict examination signals, 31 denotes an instruction distribution enable/disable signal generating circuit, m0 to m3 denote instruction distribution enable/disable signals, n0 to n3 denote data conflict examination signals, and 32 denotes an instruction execution termination detecting circuit which makes a determination of whether the execution of the distributed instructions have been terminated or suspended on the basis of the data conflict examination signals (n0 to n3). Reference characters p0 to p3 denote instruction execution inhibiting signals which notifies the instruction distribution processing device that a Branch instruction has been generated, and thus the need of executing the distributed instructions has been saved.

Reference numeral 33 denotes an instruction pointer updating circuit where the instruction execution inhibiting signals are handled as instruction execution termination signals, and r0 to r3 are instruction pointer updating signals for updating the contents of the instruction pointers 301 to 304.

Reference numerals 341 to 343 denote instruction execution termination flag registers indicating instruction execution termination states, and q0 to q2 are instruction execution termination flag signals indicating instruction execution termination states.

In this embodiment, as many instruction pointers 301 to 304 as there are instructions that can be executed in parallel are provided to save time required for decode operation, thereby generating instruction distribution enable/disable signals m0 to m3 quickly. The instruction distribution enable/disable signal generating circuit 31 comprises two-input AND gates 311 to 316, a two-input OR gate 317, a three-input OR gate 318, and a four-input OR gate 319, which are interconnected as shown to configure a circuit conforming to a carry look ahead (CLA) circuit. This circuit speeds up the operation for producing the instruction distribution enable/disable signals m0 to m3 from the resource conflict examination signals k1 to k3.

In the instruction execution termination detect circuit 32, 321, 322, 323, and 324 denote two-input gates which receive as inhibit inputs the data conflict examination signals n0, n1, n2, and n3, respectively, and as gate inputs the instruction distribution enable/disable signals m0, m1, m2, and m3, respectively. In the instruction pointer updating circuit 33, 330 to 332 denote three-input OR gates, 333 denotes a two-input OR gate, 334 denotes a three-input NOR gate, 335 denotes a two-input NOR gate, 336 and 337 denote two-input AND gates, and 338 to 340 denote two-input gates with inhibit inputs.

AND gate 311 receives resource conflict examination signal k1 and pointer output l0. OR gate 317 receives an output of AND gate 311 and pointer output l1 and outputs instruction distribution enable/disable signal m1. AND gate 312 receives resource conflict examination signal k1 and pointer output l0. AND gate 313 receives resource conflict examination signal k2 and pointer output l1. OR gate 318 receives an output of AND gate 312, an output of AND gate 313 and pointer output l2, and outputs instruction distribution enable/disable signal m2. AND gate 314 receives resource conflict examination signal k1 and pointer output l0. AND gate 315 receives resource conflict examination signal k2 and pointer output l1. AND gate 316 receives resource conflict examination signal k3 and pointer output l2. OR gate 319 receives an output of AND gate 314, an output of AND gate 315, an output of AND gate 316 and pointer output l3, and outputs instruction distribution enable/disable signal m3.

AND gate 321 receives a level inverted version of data conflict examination signal n0 and pointer output l0 as an instruction distribution enable/disable signal m0. AND gate 322 receives a level inverted version of data conflict examination signal n1 and the instruction distribution enable/disable signal m1. AND gate 323 receives a level inverted version of data conflict examination signal n2 and the instruction distribution enable/disable signal m2. AND gate 324 receives a level inverted version of data conflict examination signal n3 and the instruction distribution enable/disable signal m3.

OR gate 330 receives instruction execution termination flag signal q0, an output of AND gate 321, and instruction execution inhibiting signal p0. OR gate 331 receives instruction execution termination flag signal q1, an output of AND gate 322, and instruction execution inhibiting signal p1. OR gate 332 receives instruction execution termination flag signal q2, an output of AND gate 323, and instruction execution inhibiting signal p2. OR gate 333 receives an output of AND gate 324 and instruction execution inhibiting signal p3, and outputs signal r0 which is inputted into the instruction pointer 304 as an updating signal. NOR gate 334 receives an output of OR gate 331, an output of OR gate 332, and an output of OR gate 333. AND gate 336 receives an output of OR gate 330 and an output of NOR gate 334. AND gate 338 receives the output of OR gate 330 and an level inverted version of the output of OR gate 331, and outputs signal r1 which is inputted into the instruction pointer 301 as an updating signal. NOR gate 335 receives the output of OR gate 332 and the output of OR gate 333. AND gate 337 receives an output of OR gate 331 and an output of NOR gate 335. AND gate 339 receives the output of OR gate 331 and an level inverted version of the output of OR gate 332, and an output r2 which is inputted into the instruction pointer 302 as an updating signal. AND gate 340 receives the output of OR gate 332 and an level inverted version of the output of OR gate 333, and an output r3 which is inputted into the instruction pointer 303 as an updating signal.

Flag register 341 receives an output of AND gate 336 and outputs signal q0 which is inputted into OR gate 330. Flag register 342 receives an output of AND gate 337 and outputs signal q1 which is inputted into OR gate 331. Flag register 343 receives an output of AND gate 340 and outputs signal q2 which is inputted into OR gate 332.

In spite of having a relatively simple configuration, the embodiment of FIG. 3 also permits efficient instruction distribution control for parallel execution of instructions.

In the embodiments described above, the system configuration of the parallel processor can be simplified by forming the instruction distribution control device on the same semiconductor chip as for the instruction executing arithmetic units.

According to the present invention, as described above, there can be provided an instruction distribution control device for a parallel processor which permits efficient instruction distribution control for parallel execution of instructions with a simple configuration.

In addition, according to the present invention, there can be provided an instruction distribution processing device for a parallel processor which can speed up the instruction distribution starting position store operation by omitting instruction distribution starting position decode operation, and the operation for generating instruction distribution enable/disable signals from resource conflict examination results.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A system for controlling instruction distribution for use in a superscalar parallel processor configured to execute N instructions in parallel, wherein N is greater than 1, the system comprising:

an instruction distribution starting position pointing register for generating an instruction distribution starting position pointing signal indicating from which instruction of the N instructions an instruction distribution is started, the instruction distribution starting position pointing register for receiving a flag signal and updating said instruction distribution starting position pointing signal;

an instruction distribution enable/disable signal generating circuit connected to said instruction distribution starting position pointing register, for receiving said instruction distribution starting position pointing signal and a resource conflict signal and outputting an instruction distribution enable/disable signal indicating an enabled-distribution indicating which instruction of the N instructions is enabled and a disabled-distribution indicating which instruction of the N instructions is disabled;

a transferring line for transferring said instruction distribution enable/disable signal to an instruction executing system;

a flag signal generating circuit, connected to said instruction distribution enable/disable signal generating circuit, for receiving said instruction distribution enable/ disable signal and a data conflict signal and for outputting said flag signal indicating which of the N instructions has been executed; and a feedback line for feeding said flag signal back to said instruction distribution starting position pointing register.

2. The system for controlling instruction distribution according to claim 1, in which said instruction distribution starting position pointing register comprises instruction distribution starting position pointing means corresponding in number to the instructions that are executed in parallel.

3. The system for controlling instruction distribution according to claim 1, in which said data conflict signal includes a signal indicating a suspension of execution of instructions and a signal indicating an inhibition of execution of instructions.

4. The system for controlling instruction distribution according to claim 1, in which said instruction distribution enable/disable signal generating circuit comprises a look ahead circuit to generate said instruction distribution enable/disable signal.

5. A system for controlling instruction distribution for use in a superscalar parallel processor configured to execute N instructions in parallel, wherein N is greater than 1, the system comprising:

an instruction distribution starting position pointing register for generating an instruction distribution starting position pointing signal indicating from which instruction of the N instructions an instruction distribution is started, the instruction distribution starting position pointing register for receiving an updating signal and updating said instruction distribution starting position pointing signal;

an instruction distribution enable/disable signal generating circuit connected to said instruction distribution starting position pointing register, for receiving said instruction distribution starting position pointing signal and a resource conflict signal and outputting an instruction distribution enable/disable signal indicating an enabled-distribution indicating which instruction of the N instructions is enabled and a disabled-distribution indicating which instruction of the N instructions is disabled;

a transferring line for transferring said instruction distribution enable/disable signal to an instruction executing system;

an instruction execution state signal generating circuit, connected to said instruction distribution enable/disable signal generating circuit, for receiving said instruction distribution enable/disable signal, a data conflict signal and a flag signal, and for outputting said updating signal and an instruction execution state signal, the instruction execution state signal indicating which instruction of the N instructions has been executed;

a flag register connected to said instruction execution state signal generating circuit, for holding said instruction execution state signal which is fed back to said instruction execution state signal generating circuit as said flag signal; and a feedback line for feeding said updating signal back to said instruction distribution starting position pointing register.

* * * * *

UNITED STATES PATENT AND TRADEMARK OFFICE
CERTIFICATE OF CORRECTION

PATENT NO. : 5,621,910
DATED : April 15, 1997
INVENTOR(S) : Masato NAGAMATSU

It is certified that error appears in the above-indentified patent and that said Letters Patent is hereby corrected as shown below:

On the title page, item [54] and Col. 1, lines 1-4, in the Title, Change "SYSTEM FOR CONTROLLING INSTRUCTION DISTRIBUTION FOR USE IN SUPERSCALAR PARALLEL PROCESSOR" TO -- INSTRUCTION DISTRIBUTION CONTROL DEVICE FOR PARALLEL PROCESSORS CONTROLLING BOTH DATA AND RESOURCE CONFLICTS--.

Signed and Sealed this

Fourteenth Day of October, 1997

Attest:

BRUCE LEHMAN

Attesting Officer

Commissioner of Patents and Trademarks